US008935269B2

(12) United States Patent
Messer et al.

(10) Patent No.: US 8,935,269 B2
(45) Date of Patent: Jan. 13, 2015

(54) METHOD AND APPARATUS FOR CONTEXTUAL SEARCH AND QUERY REFINEMENT ON CONSUMER ELECTRONICS DEVICES

(75) Inventors: Alan Messer, Los Gatos, CA (US); Mithun Sheshagiri, Berkeley, CA (US); Anugeetha Kunjithapatham, Sunnyvale, CA (US); Priyang Rathod, Mountain View, CA (US); Phuong Nguyen, San Jose, CA (US); Doreen Cheng, San Jose, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 394 days.

(21) Appl. No.: 11/633,880

(22) Filed: Dec. 4, 2006

(65) Prior Publication Data
US 2008/0133504 A1    Jun. 5, 2008

(51) Int. Cl.
*G06F 7/00* (2006.01)
*G06F 17/30* (2006.01)

(52) U.S. Cl.
CPC .... *G06F 17/30646* (2013.01); *G06F 17/30867* (2013.01)
USPC ............................ 707/758; 707/765; 707/769

(58) Field of Classification Search
None
See application file for complete search history.

(56) References Cited

U.S. PATENT DOCUMENTS

| | | |
|---|---|---|
| 5,616,876 A | 4/1997 | Cluts |
| 5,790,935 A | 8/1998 | Payton |
| 5,918,223 A | 6/1999 | Blum et al. |
| 5,974,406 A | 10/1999 | Bisdikian et al. |
| 5,983,214 A | 11/1999 | Lang et al. |
| 5,983,237 A | 11/1999 | Jain et al. |
| 5,995,959 A | 11/1999 | Friedman et al. |
| 6,151,603 A | 11/2000 | Wolfe |
| 6,253,238 B1 | 6/2001 | Lauder et al. |
| 6,334,127 B1 | 12/2001 | Bieganski et al. |
| 6,412,073 B1 | 6/2002 | Rangan |
| 6,438,579 B1 | 8/2002 | Hosken |
| 6,480,844 B1 | 11/2002 | Cortes et al. |
| 6,564,210 B1 | 5/2003 | Korda et al. |
| 6,564,213 B1 | 5/2003 | Ortega et al. |

(Continued)

FOREIGN PATENT DOCUMENTS

| | | |
|---|---|---|
| CN | 1393107 | 1/2003 |
| CN | 1723458 | 12/2003 |

(Continued)

OTHER PUBLICATIONS

Apple Inc., Apple iTunes, http://www.apple.com/itunes/, Apr. 28, 2003.

(Continued)

*Primary Examiner* — Debbie Le
*Assistant Examiner* — Hasanul Mobin
(74) *Attorney, Agent, or Firm* — Kenneth L. Sherman, Esq.; Michael Zarrabian, Esq.; Sherman & Zarrabian LLP

(57) ABSTRACT

A method and a system for searching for information using an electronic device, such as a consumer electronic device, that can be connected to a network. Such searching for information involves determining a context for a search for information, forming a search query based on the context of search for information, and performing a contextual search based on the search query. Performing the contextual search further includes performing a query refinement.

26 Claims, 4 Drawing Sheets

(56) References Cited

U.S. PATENT DOCUMENTS

| | | |
|---|---|---|
| 6,601,061 B1 | 7/2003 | Holt et al. |
| 6,637,028 B1 | 10/2003 | Voyticky et al. |
| 6,665,658 B1 * | 12/2003 | DaCosta et al. .................... 1/1 |
| 6,721,748 B1 | 4/2004 | Knight et al. |
| 6,766,523 B2 | 7/2004 | Herley |
| 6,774,926 B1 | 8/2004 | Ellis et al. |
| 6,807,675 B1 | 10/2004 | Maillard et al. |
| 6,826,512 B2 | 11/2004 | Dara-Abrams et al. |
| 6,834,284 B2 | 12/2004 | Acker et al. |
| 6,842,877 B2 | 1/2005 | Robarts et al. |
| 6,954,755 B2 | 10/2005 | Reisman |
| 6,981,040 B1 | 12/2005 | Konig et al. |
| 7,013,300 B1 * | 3/2006 | Taylor ................................ 1/1 |
| 7,028,024 B1 | 4/2006 | Kommers et al. |
| 7,054,875 B2 | 5/2006 | Keith, Jr. |
| 7,062,561 B1 | 6/2006 | Reisman |
| 7,069,575 B1 | 6/2006 | Goode et al. |
| 7,110,998 B1 | 9/2006 | Bhandari et al. |
| 7,158,961 B1 | 1/2007 | Charikar |
| 7,158,986 B1 | 1/2007 | Oilver et al. |
| 7,162,473 B2 | 1/2007 | Dumais et al. |
| 7,165,080 B2 | 1/2007 | Kotcheff et al. |
| 7,181,438 B1 | 2/2007 | Szabo |
| 7,194,460 B2 | 3/2007 | Komamura |
| 7,203,940 B2 | 4/2007 | Barmettler et al. |
| 7,225,187 B2 | 5/2007 | Dumais et al. |
| 7,283,992 B2 | 10/2007 | Liu et al. |
| 7,284,202 B1 | 10/2007 | Zenith |
| 7,343,365 B2 | 3/2008 | Farnham et al. |
| 7,363,294 B2 | 4/2008 | Billsus et al. |
| 7,386,542 B2 * | 6/2008 | Maybury et al. ............. 707/733 |
| 7,389,224 B1 * | 6/2008 | Elworthy ......................... 704/9 |
| 7,389,307 B2 | 6/2008 | Golding |
| 7,433,935 B1 | 10/2008 | Obert |
| 7,483,921 B2 | 1/2009 | Tsuzuki et al. |
| 7,552,114 B2 | 6/2009 | Zhang et al. |
| 7,565,345 B2 | 7/2009 | Bailey et al. |
| 7,577,718 B2 | 8/2009 | Slawson et al. |
| 7,593,921 B2 | 9/2009 | Goronzy et al. |
| 7,603,349 B1 * | 10/2009 | Kraft et al. ........................ 1/1 |
| 7,613,736 B2 | 11/2009 | Hicken |
| 7,617,176 B2 | 11/2009 | Zeng et al. |
| 7,634,461 B2 | 12/2009 | Oral et al. |
| 7,657,518 B2 | 2/2010 | Budzik et al. |
| 7,685,192 B1 | 3/2010 | Scofield et al. |
| 7,716,158 B2 | 5/2010 | McConnell |
| 7,716,199 B2 | 5/2010 | Guha |
| 7,725,486 B2 | 5/2010 | Tsuzuki et al. |
| 7,793,326 B2 | 9/2010 | McCoskey |
| 7,899,915 B2 | 3/2011 | Reisman |
| 7,958,115 B2 | 6/2011 | Kraft |
| 8,028,323 B2 | 9/2011 | Weel |
| 8,090,606 B2 | 1/2012 | Svendsen |
| 2001/0003214 A1 * | 6/2001 | Shastri et al. ................ 725/109 |
| 2001/0023433 A1 | 9/2001 | Natsubori et al. |
| 2002/0002899 A1 | 1/2002 | Gjerdingen et al. |
| 2002/0022491 A1 | 2/2002 | McCann et al. |
| 2002/0026436 A1 | 2/2002 | Joory |
| 2002/0032693 A1 | 3/2002 | Chiou et al. |
| 2002/0087535 A1 * | 7/2002 | Kotcheff et al. ................ 707/5 |
| 2002/0147628 A1 | 10/2002 | Specter et al. |
| 2002/0161767 A1 | 10/2002 | Shapiro et al. |
| 2002/0162121 A1 | 10/2002 | Mitchell |
| 2003/0009537 A1 | 1/2003 | Wang |
| 2003/0028889 A1 | 2/2003 | McCoskey |
| 2003/0033273 A1 | 2/2003 | Wyse |
| 2003/0070061 A1 | 4/2003 | Wong et al. |
| 2003/0088553 A1 * | 5/2003 | Monteverde ..................... 707/3 |
| 2003/0105682 A1 | 6/2003 | Dicker et al. |
| 2003/0131013 A1 | 7/2003 | Pope et al. |
| 2003/0158855 A1 * | 8/2003 | Farnham et al. ............. 707/102 |
| 2003/0172075 A1 | 9/2003 | Reisman |
| 2003/0184582 A1 | 10/2003 | Cohen |
| 2003/0221198 A1 | 11/2003 | Sloo |
| 2003/0229900 A1 | 12/2003 | Reisman |
| 2003/0231868 A1 * | 12/2003 | Herley ............................. 386/69 |
| 2004/0031058 A1 | 2/2004 | Reisman |
| 2004/0073944 A1 | 4/2004 | Booth |
| 2004/0107821 A1 | 6/2004 | Alcalde et al. |
| 2004/0194141 A1 | 9/2004 | Sanders |
| 2004/0220925 A1 | 11/2004 | Liu et al. |
| 2004/0244038 A1 | 12/2004 | Utsuki et al. |
| 2004/0249790 A1 * | 12/2004 | Komamura ....................... 707/3 |
| 2005/0004910 A1 | 1/2005 | Trepess |
| 2005/0137996 A1 * | 6/2005 | Billsus et al. .................... 707/1 |
| 2005/0144158 A1 * | 6/2005 | Capper et al. .................... 707/3 |
| 2005/0154711 A1 | 7/2005 | McConnell |
| 2005/0160460 A1 | 7/2005 | Fujiwara et al. |
| 2005/0177555 A1 * | 8/2005 | Alpert et al. ..................... 707/3 |
| 2005/0240580 A1 | 10/2005 | Zamir et al. |
| 2005/0246726 A1 | 11/2005 | Labrou et al. |
| 2005/0278362 A1 * | 12/2005 | Maren et al. ................. 707/100 |
| 2005/0289599 A1 | 12/2005 | Matsuura et al. |
| 2006/0026152 A1 * | 2/2006 | Zeng et al. ........................ 707/5 |
| 2006/0028682 A1 | 2/2006 | Haines |
| 2006/0036593 A1 | 2/2006 | Dean et al. |
| 2006/0066573 A1 | 3/2006 | Matsumoto |
| 2006/0074883 A1 | 4/2006 | Teevan et al. |
| 2006/0084430 A1 | 4/2006 | Ng |
| 2006/0095415 A1 | 5/2006 | Sattler et al. |
| 2006/0129533 A1 | 6/2006 | Purvis |
| 2006/0133391 A1 | 6/2006 | Kang et al. |
| 2006/0136670 A1 | 6/2006 | Brown et al. |
| 2006/0156252 A1 | 7/2006 | Sheshagiri et al. |
| 2006/0156326 A1 | 7/2006 | Goronzy et al. |
| 2006/0161542 A1 | 7/2006 | Cucerzan et al. |
| 2006/0184515 A1 | 8/2006 | Goel et al. |
| 2006/0195362 A1 | 8/2006 | Jacobi et al. |
| 2006/0210157 A1 * | 9/2006 | Agnihotri et al. ............. 382/173 |
| 2006/0242283 A1 | 10/2006 | Shaik et al. |
| 2007/0038601 A1 | 2/2007 | Guha et al. |
| 2007/0038934 A1 | 2/2007 | Fellman |
| 2007/0043703 A1 | 2/2007 | Bhattacharya et al. |
| 2007/0050346 A1 * | 3/2007 | Goel et al. ........................ 707/3 |
| 2007/0061222 A1 | 3/2007 | Allocca et al. |
| 2007/0061352 A1 | 3/2007 | Dimitrova et al. |
| 2007/0073894 A1 | 3/2007 | Erickson et al. |
| 2007/0078822 A1 | 4/2007 | Cucerzan et al. |
| 2007/0101291 A1 | 5/2007 | Forstall et al. |
| 2007/0107019 A1 | 5/2007 | Romano et al. |
| 2007/0130585 A1 | 6/2007 | Perret et al. |
| 2007/0143266 A1 | 6/2007 | Tang et al. |
| 2007/0156447 A1 | 7/2007 | Kim et al. |
| 2007/0179776 A1 | 8/2007 | Segond et al. |
| 2007/0198485 A1 * | 8/2007 | Ramer et al. ..................... 707/3 |
| 2007/0198500 A1 | 8/2007 | Lucovsky et al. |
| 2007/0208755 A1 | 9/2007 | Bhatkar et al. |
| 2007/0214123 A1 | 9/2007 | Messer et al. |
| 2007/0214488 A1 | 9/2007 | Nguyen et al. |
| 2007/0220037 A1 | 9/2007 | Srivastava et al. |
| 2007/0233287 A1 | 10/2007 | Sheshagiri et al. |
| 2007/0300078 A1 | 12/2007 | Ochi et al. |
| 2008/0040316 A1 | 2/2008 | Lawrence |
| 2008/0040426 A1 | 2/2008 | Synstelien et al. |
| 2008/0082627 A1 | 4/2008 | Allen et al. |
| 2008/0082744 A1 | 4/2008 | Nakagawa |
| 2008/0097982 A1 | 4/2008 | Gupta |
| 2008/0114751 A1 | 5/2008 | Cramer et al. |
| 2008/0133501 A1 | 6/2008 | Andersen et al. |
| 2008/0133504 A1 | 6/2008 | Messer et al. |
| 2008/0162651 A1 | 7/2008 | Madnani |
| 2008/0162731 A1 | 7/2008 | Kauppinen et al. |
| 2008/0183596 A1 | 7/2008 | Nash et al. |
| 2008/0183681 A1 | 7/2008 | Messer et al. |
| 2008/0183698 A1 | 7/2008 | Messer et al. |
| 2008/0204595 A1 | 8/2008 | Rathod et al. |
| 2008/0208839 A1 | 8/2008 | Sheshagiri et al. |
| 2008/0222232 A1 | 9/2008 | Allen et al. |
| 2008/0229240 A1 | 9/2008 | Garbow et al. |
| 2008/0235209 A1 | 9/2008 | Rathod et al. |
| 2008/0235393 A1 | 9/2008 | Kunjithapatham et al. |
| 2008/0242279 A1 | 10/2008 | Ramer et al. |
| 2008/0250010 A1 | 10/2008 | Rathod et al. |
| 2008/0256460 A1 | 10/2008 | Bickmore |

(56) References Cited

U.S. PATENT DOCUMENTS

| | | | |
|---|---|---|---|
| 2008/0266449 A1 | 10/2008 | Rathod et al. | |
| 2008/0288641 A1 | 11/2008 | Messer et al. | 709/228 |
| 2008/0294998 A1 | 11/2008 | Pyhalammi et al. | |
| 2009/0029687 A1 | 1/2009 | Ramer et al. | |
| 2009/0044144 A1 | 2/2009 | Morris | |
| 2009/0055393 A1 | 2/2009 | Messer et al. | |
| 2009/0064017 A1 | 3/2009 | Biniak et al. | |
| 2009/0070184 A1 | 3/2009 | Svendsen | |
| 2009/0077052 A1 | 3/2009 | Farrelly | |
| 2009/0077065 A1 | 3/2009 | Song et al. | |
| 2009/0094339 A1 | 4/2009 | Allen et al. | |
| 2009/0112848 A1 | 4/2009 | Kunjithapatham et al. | |
| 2009/0119717 A1 | 5/2009 | Newton et al. | |
| 2009/0248883 A1 | 10/2009 | Suryanarayana et al. | |
| 2009/0288014 A1 | 11/2009 | Fujioka | |
| 2010/0070895 A1 | 3/2010 | Messer | |
| 2010/0191619 A1 | 7/2010 | Dicker et al. | |
| 2010/0257196 A1 | 10/2010 | Waters et al. | |
| 2010/0281393 A1 | 11/2010 | Fujioka | |
| 2011/0208768 A1 | 8/2011 | Mehanna | |

FOREIGN PATENT DOCUMENTS

| | | |
|---|---|---|
| CN | 1585947 | 2/2005 |
| CN | 1723458 | 1/2006 |
| CN | 1808430 | 7/2006 |
| CN | 1848742 | 10/2006 |
| CN | 1906610 | 1/2007 |
| JP | 2003-099442 | 4/2003 |
| JP | 2004505563 | 2/2004 |
| JP | 2006/228198 | 8/2006 |
| JP | 2007-012013 | 1/2007 |
| KR | 20020005147 | 1/2002 |
| KR | 20020006810 | 1/2002 |
| KR | 20040052339 | 6/2004 |
| KR | 20060027226 | 3/2006 |
| WO | 0137465 | 5/2001 |
| WO | 0180077 A1 | 10/2001 |
| WO | 0243310 | 5/2002 |
| WO | WO 03/042866 | 5/2003 |
| WO | 2005055196 | 6/2005 |
| WO | WO 2005/072157 | 8/2005 |
| WO | 2007004110 | 1/2007 |
| WO | 2008030875 A2 | 3/2008 |

OTHER PUBLICATIONS

Babaguchi, N. et al., "Intermodal collaboration: A strategy for semantic content analysis for broadcasted sports video," Sep. 2003, pp. 13-16.
Brill, E., "A simple rule-based part of speech tagger," Mar. 1992, Proceedings of the Third Conference on Applied Natural Language Processing, Trento, Italy.
Google Inc., Google Search Engine, http://www.google.com, Aug. 1998.
Google Inc., Google Desktop Search, http://desktop.google.com, Oct. 15, 2004.
Henzinger, M. et al, "Query-free news search," May 2003, Proceedings on the 12$^{th}$ International Conference on World Wide Web, Budapest, Hungary.
Livingston, K. et al., "Beyond broadcast: a demo," Jan. 2003, in Proceedings of the 8th international Conference on intelligent User interfaces, ACM Press, New York, NY, 325-325.
Microsoft Corporation, Microsoft Windows Media Player, http://www.microsoft.com/windows/windowsmedia/, Feb. 1999.
Microsoft Corporation, MSN TV, http://www.webtv.com/pc, Feb. 2006.
Opera Software ASA, Opera Browser for Devices, http://www.opera.com/products/devices/, Mar. 2006.
Rau Lisa, F. et al, "Domain-independent summarization of news," Jun. 1994, in Summarizing Text for Intelligent Communication, pp. 71-75, Dagstuhl, Germany.
Spalti, M., "Finding and Managing Web Content with Copernic 2000," Sep. 2000, Library Computing, Westport, pp. 217-221, vol. 18, No. 3.
Tjondronegoro, D. et al., "Extensible detection and indexing of highlight events in broadcasted sports video," Jan. 2006, Proceedings of the 29th Australasian Computer Science Conference, Hobart, Australia.
Wachman, J. et al., "Tools for Browsing a TV Situation Comedy Based on Content Specific Attributes," Mar. 2001, Multimedia Tools and Applications, v.13 n.3, p. 255-284.
Yahoo Search Engine, http://search.yahoo.com, Dec. 1998.
Zhuang, Y. et al, "Applying semantic association to support content-based video retrieval," Oct. 1998, International workshop on Very Low Bitrate Video Coding (VLBV'98).
Notification of Transmittal of the International Search Report and the Written Opinion of the International Search Authority Application No. PCT/KR2008/000537 dated May 15, 2008, 16 pages.
Notification of Transmittal of the International Search Report and the Written Opinion of the International Searching Authority for International Application No. PCT/KR2008/001558, dated Jun. 26, 2008, 10 pages.
Notification of Transmittal of the International Search Report and the Written Opinion of the International Searching Authority, dated Aug. 20, 2008; International Search Report and Written Opinion of the International Searching Authority for International Application No. PCT/KR2008/001941, 10 pages.
Moraveji, N. et al., "DynaLine: A Non-Disruptive TV User Interface for Passive Browsing of Internet Video," Microsoft Research Technical Report, 2006, pp. 1-4, United States.
Miyamori, H. et al., "Webified Video: Media Conversion from TV Programs to Web Content for Cross-Media Information Integration," Proceedings of the 16th International Conference on Database and Expert Systems Applications, 2005, pp. 176-185, Springer-Verlag, Berlin, Heidelberg, Germany.
Copernic Inc., Copernic Search Engine for your PC, http://www.copernic.com, downloaded Sep. 19, 2008, pp. 1, United States.
AOL LLC, http://www.aol.com, downloaded Sep. 19, 2008, pp. 1-2, United States.
Ask Search Engine, http://www.ask.com, downloaded Sep. 19, 2008, pp. 1, United States.
"Placement in the DMOZ.org directory—Pure Power", DMOZ/Google Directory, posted on Apr. 30, 2005, http://www.ahfx.net/weblog/13, pp. 1-3, United States.
Microsoft Corporation, Microsoft Windows Media Player 10, http://www.microsoft.com/windows/windowsmedia/mp10, downloaded Sep. 19, 2008, United States.
Microsoft Corporation, Microsoft Windows Media Player, http://www.microsoft.com/windows/windowsmedia/, Sep. 19, 2008, pp. 1, United States.
Realnetworks, Inc., http://www.real.com, downloaded Sep. 19, 2008, United States.
U.S. Non-final Office Action for U.S. Appl. No. 11/725,865 mailed Oct. 16, 2009.
U.S. Non-final Office Action for U.S. Appl. No. 11/713,350 mailed Mar. 2, 2009.
U.S. Final Office Action for U.S. Appl. No. 11/713,350 mailed Aug. 14, 2009.
U.S. Non-final Office Action for U.S. Appl. No. 11/803,826 mailed Jul. 24, 2009.
U.S. Non-final Office Action for U.S. Appl. No. 11/900,847 mailed Oct. 28, 2009.
Livingston, K. et al., "Beyond Broadcast," 8th International Conference on Intelligent User Interfaces, Jan. 2003, pp. 260-262, Association for Computing Machinery, New York, NY.
U.S. Final Office Action for U.S. Appl. No. 11/725,865 mailed Mar. 16, 2010.
U.S. Non-final Office Action for U.S. Appl. No. 11/713,250 mailed Mar. 8, 2010.
U.S. Final Office Action for U.S. Appl. No. 11/803,826 mailed Mar. 3, 2010.
U.S. Non-final Office Action for U.S. Appl. No. 12/056,184 mailed on Jun. 11, 2010.

(56) References Cited

OTHER PUBLICATIONS

U.S. Final Office Action for U.S. Appl. No. 12/056,184 mailed on Nov. 23, 2010.
U.S. Non-Final Office Action for U.S. Appl. No. 11/726,340 mailed May 19, 2009.
U.S. Non-final Office Action for U.S. Appl. No. 11/732,887 mailed on Jun. 5, 2009.
U.S. Final Office Action for U.S. Appl. No. 11/969,778 mailed on Sep. 2, 2010.
U.S. Non-final Office Action for U.S. Appl. No. 11/969,778 mailed on Apr. 19, 2010.
Vechtomova, O. et al., "Query expansion with terms selected using lexical cohesion analysis of documents", Information Processing and Management: an International Journal, Oct. 2006, pp. 849-865, vol. 43, No. 4, Pergamon Press Inc., Tarrytown, New York, United States.
U.S. Non-final Office Action for U.S. Appl. No. 11/725,865 mailed Sep. 14, 2010.
U.S. Final Office Action for U.S. Appl. No. 11/713,350 mailed Sep. 9, 2010.
U.S. Office Action for U.S. Appl. No. 11/726,340 mailed Oct. 14, 2010.
U.S. Office Action for U.S. Appl. No. 11/726,340 mailed Feb. 14, 2011.
U.S. Office Action for U.S. Appl. No. 11/726,340 mailed Dec. 9, 2009.
U.S. Office Action for U.S. Appl. No. 12/263,089 mailed Mar. 25, 2011.
U.S. Office Action for U.S. Appl. No. 11/732,887 mailed on Dec. 4, 2009.
U.S. Office Action for U.S. Appl. No. 11/725,865 mailed Mar. 4, 2011.
U.S. Office Action for U.S. Appl. No. 11/803,826 mailed Jun. 1, 2011.
Office Action dated Jun. 27, 2011 from U.S. Appl. No. 11/725,865.
Office Action dated Jul. 6, 2011 from U.S. Appl. No. 11/789,609.
Office Action dated Oct. 6, 2010 from U.S. Appl. No. 11/981,019.
Office Action dated Dec. 29, 2009 from U.S. Appl. No. 11/981,019.
Final Office Action dated Mar. 16, 2011 from U.S. Appl. No. 11/981,019.
Final Office Action dated Jun. 17, 2010 from U.S. Appl. No. 11/981,019.
Office Action dated Aug. 2, 2011 from U.S. Appl. No. 11/713,312.
Google Inc., webhp, http://www.google.com/webhp?complete-1&hl-en, downloaded Sep. 25, 2008, p. 1.
Office Action dated Mar. 25, 2010 from Chinese Patent Application No. 200810082621.3, 7pp., China (English-language translation included—15 pp).
Tivo Inc., http://www.tivo.com, downloaded Sep. 19, 2008, 1 page.
"Computing Meng Individual Project, ANSES—Automatic News Summarization and Extraction System,"http://mmis.doc.ic.ac.uk/pr-1.wong-2002/overview.html, downloaded Sep. 24, 2008, 4 pages.
Miyauchi et al., "Highlight Detection and Indexing in Broadcast Sports Video by Collaborative Processing of Text, Audio, and Image," Sytstems and Computers in Japan, vol. 34, No. 12, 2003, pp. 22-31, Translated from Denshi Joho Tsushin Gakkai Ronbunshi, vol. J85-D-II, No. 11, Nov. 2002, pp. 1692-1700.
Nitta, Naoka et al., "Automatic Story Segmentation of Closed-Caption Text for Semantic Content Analysis of Broadcasted Sports Video," 8th International Workshop on Multimedia Information Systems, 2002, pp. 110-116.
Miura, K. et al., "Automatic Generation of a Multimedia Encyclopedia from TV Programs by Using Closed Captions and Detecting Principal Viedo Objects,"Proceedings of the Eighth IEEE International Sympsosium on Miltumedia (ISM '06), 2006, IEEE, 8 pages.
Office Action dated Aug. 19, 2011 from U.S. Appl. No. 11/821,938.
Office Action dated Aug. 22, 2011 from U.S. Appl. No. 11/981,019.
Final Office Action dated Sep. 1, 2011 from U.S. Appl. No. 12/263,089.
Office Action dated Sep. 8, 2011 from U.S. Appl. No. 12/544,994.
Final Office Action dated Sep. 21, 2011 from U.S. Appl. No. 11/633,880.
Final Office Action dated Sep. 27, 2011 from U.S. Appl. No. 11/969,778.
Notice of Allowance dated Nov. 1, 2011 from U.S. Appl. No. 11/821,938.
Chinese Office Action dated Feb. 1, 2011 from Chinese Application No. 2007101962371.
Final Office Action dated Nov. 10, 2011 from U.S. Appl. No. 11/803,826.
U.S. Office Action for U.S. Appl. No. 11/969,778 mailed Jun. 15, 2011.
Chinese Office Action dated Sep. 23, 2011 from Chinese Application No. 200880016311.X.
Chinese Office Action dated Sep. 8, 2011 from Chinese Application No. 200880009063.6.
Office Action dated Jan. 17, 2012 from U.S. Appl. No. 12/544,994.
Copernic Inc., http://copernic.com/en/products/desktop-search/index.html, Sep. 18, 2008.
Chinese Office Action dated Aug. 14, 2009 issued in Chinese Patent Application No. 2008100826213.
Japanese Office Action dated Mar. 21, 2012 from Japanese Application No. 2009-554447.
Chinese Office Action dated Apr. 17, 2012 from Chinese Application No. 200880016311.X.
Japanese Office Action dated Apr. 10, 2012 from Japanese Application No. 2010-508303.
Office Action dated Mar. 29, 2012 from U.S. Appl. No. 11/726,340.
Notice of Allowance dated Jan. 30, 2012 from U.S. Appl. No. 11/981,019.
Chinese Office Action dated Aug. 28, 2012 for Chinese Application No. 200880016311.X from China Patent Office, pp. 1-24, People's Republic of China (English-language translation included, pp. 1-15).
U.S. Final Office Action for U.S. Appl. No. 12/544,994 mailed Oct. 23, 2012.
Chinese Office Action dated Mar. 7, 2013 for Chinese Application No. 200880016311.X from China Intellectual Property Office, pp. 1-25, People's Republic of China (English-language translation included, pp. 1-16).
U.S. Notice of Allowance for U.S. Appl. No. 11/726,340 mailed Apr. 29, 2013.
Japanese Office Action dated Nov. 20, 2012 for Chinese Application No. 2009554447 from Japan Patent Office, pp. 1-4, Tokyo, Japan (Machine generated English-language translation included, pp. 1-2).
U.S. Advisory Action for U.S. Appl. No. 12/544,994 mailed Jan. 23, 2013.
U.S. Non-Final Office Action for U.S. Appl. No. 12/544,994 mailed Jul. 17, 2013.
U.S. Final Office Action for U.S. Appl. No. 12/544,994 mailed Nov. 5, 2013.
U.S. Notice of Allowance for U.S. Appl. No. 11/803,826 mailed Mar. 27, 2014.
U.S. Non-Final Office Action for U.S. Appl. No. 12/544,994 mailed Mar. 28, 2014.
U.S. Notice of Allowance for U.S. Appl. No. 12/544,994 mailed Sep. 19, 2014.

* cited by examiner

300

400

METHOD AND APPARATUS FOR CONTEXTUAL SEARCH AND QUERY REFINEMENT ON CONSUMER ELECTRONICS DEVICES

FIELD OF THE INVENTION

The present invention relates to contextual searches, and in particular, to search and query refinement on consumer electronic (CE) devices.

BACKGROUND OF THE INVENTION

The Internet (Web) has become a major source of information on virtually every conceivable topic. The easy accessibility of such vast amounts of information is unprecedented. In the past, someone seeking even the most basic information related to a topic was required to refer to a book or visit a library, spending many hours without a guarantee of success. However, with the advent of computers and the Internet, an individual can obtain virtually any information within a few clicks of a keyboard.

A consumer electronic (CE) device can be enriched by enabling the device to seamlessly obtain related information from the Internet, while the user enjoys the content available at home. However, at times, finding the right piece of information from the Internet can be difficult. The complexity of natural language, with characteristics such as polysemy, makes retrieving the proper information a non-trivial task. The same word, when used in different contexts can imply completely different meanings. For example, the word "sting" may mean bee sting when used in entomology, an undercover operation in a spy novel or the name of an artist when used in musical context. In the absence of any information about the context, it is difficult to obtain the proper results.

The traditional searching approach on a personal computer (PC) has been for a user to form an initial query and then iteratively refine the query depending upon the kind of results obtained based on the initial query. There are several problems with applying the PC approach to a CE device. First, a CE device would require a keyboard for a user to repeatedly enter queries/refinements to find the proper results. Further, searching is an involving process requiring some amount of cognitive load. A consumer using a CE device to listen to her favorite music may not be inclined to find relevant information from the Internet if it requires more effort than pushing a few buttons.

Further, querying a search engine not only requires entering keywords using a keyboard, but as noted, typically several iterations of refinement are required before the desired results are obtained. On a typical CE device without a keyboard, this is difficult to achieve. Forming a good query requires the user to have at least some knowledge about the context of the information desired, as well as the ability to translate that knowledge into appropriate search words. Even if the user has the skills required to form a good query and the means to enter the query, she may not be inclined to do so while using a CE device for entertainment. There is, therefore, a need for a method and system that provides contextual search and query refinement for CE devices.

BRIEF SUMMARY OF THE INVENTION

The present invention provides a method and a system for searching for information using an electronic device, such as a CE device, that can be connected to a network. Such searching for information involves determining a context for a search for information, forming a search query based on the context of search for information, and performing a contextual search based on the search query. Performing the contextual search further includes performing a query refinement.

The network includes a local network including CE devices, and an external network such as the Internet, wherein the search is directed to information in the external network. Determining the context further includes determining the context based on the content in the network, wherein searching further includes filtering the search results based on said context.

Determining the context further includes using metadata related to the content in the local network to determine the context for search query formation. Determining said context can further include using metadata related to the content in the network and current application states in the local network, to determine the context for query formation and result filtering.

Determining said context can further include gathering metadata about available content in the network. When the network includes a local network and an external network, the step of gathering metadata further includes gathering metadata about available content in the local network.

In addition, the step of determining said context can further include determining the context using metadata related to: available content in the local network, current application states in the local network and additional contextual terms derived from the external network.

As such, the present invention provides contextual search and query refinement for CE devices. The cognitive load of query formation is relegated to the device itself, freeing the user to simply enjoy the content. Knowing the context of the search query, the device then uses that context for query formation, as well as result filtering on behalf of the user.

These and other features, aspects and advantages of the present invention will become understood with reference to the following description, appended claims and accompanying figures.

DETAILED DESCRIPTION OF THE INVENTION

The present invention provides contextual search and query refinement for CE devices, wherein a cognitive load of query formation is relegated to the device itself, freeing the user to simply enjoy the content. The device then uses that context for query formation, as well as result filtering on behalf of the user.

In one example implementation involving a local area network, metadata related to local content and current application states are gathered. The application states include user application states such as the current device(s) activity, for example, playing a music CD, playing a DVD, etc. The gathered data is then used to obtain the context for query formation and result filtering, essentially without user intervention. In this example, the user application states, the local context, and optionally, additional contextual terms derived from external sources (e.g., the external network), are utilized to form an appropriate query. The query is submitted to a search engine and the results are presented to a user. Preferably, contextual information is used to refine the search results returned by the search engine so that the search results are more likely to satisfy the user request.

Figure 1:
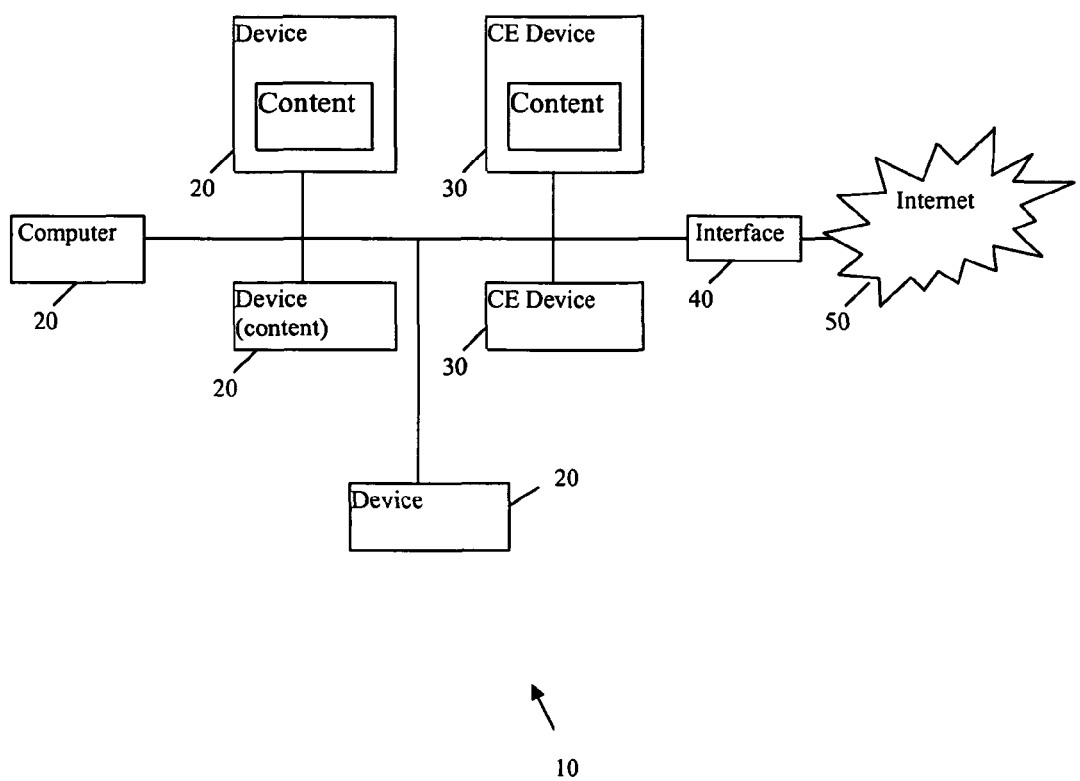
FIG. 1 shows an example of a network implementing an embodiment of the present invention.

FIG. 1 shows a functional architecture of an example network 10, such as a local network (e.g., a home network) embodying aspects of the present invention. The network 10 comprises devices 20 which may include content, CE devices 30 (e.g., a cell phone, PDA, MP3 player, TV, VCR, STB, etc.) which may include content, and an interface device 40 that connects the network 10 to an external network 50 (e.g., another local network, the Internet, etc.). Though the devices 20 and 30 are shown separately, a single physical device can include one or more logical devices.

The devices 20 and 30, respectively, can implement the UPnP protocol for communication therebetween. Those skilled in the art will recognize that the present invention is useful with other network communication protocols such as JINI, HAVi, 1394, etc. The network 10 can comprise a wireless network, a wired network, or a combination thereof.

Figure 2:
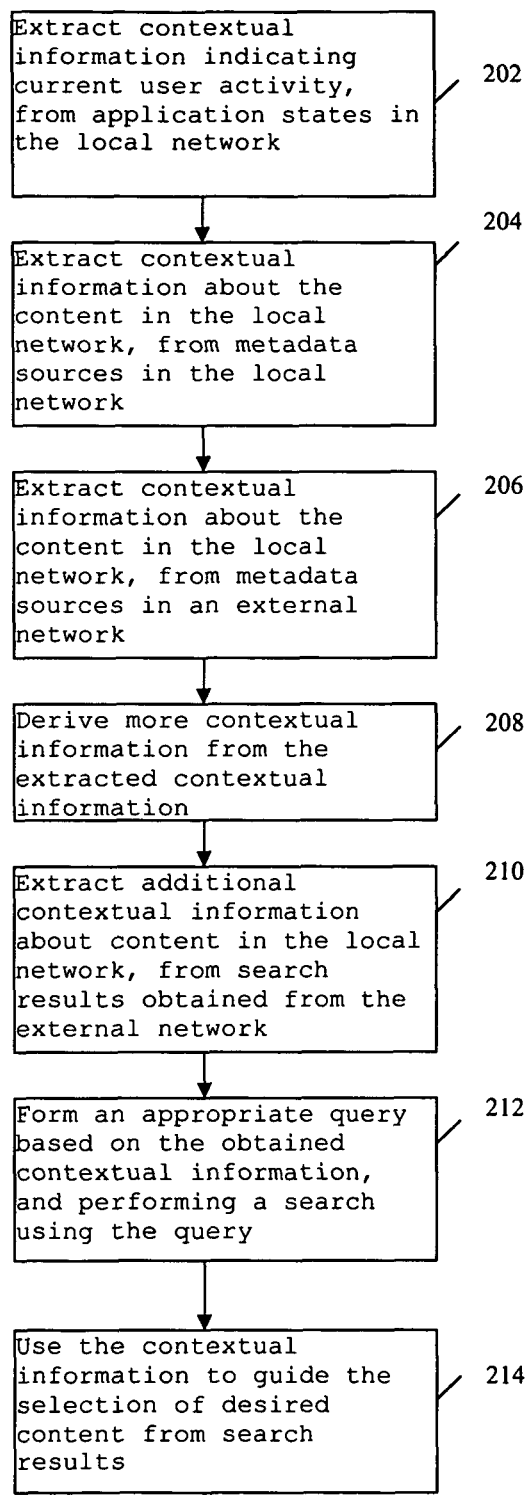
FIG. 2 shows an example contextual search and query refinement method for CE devices, according to an embodiment of the present invention.

Referring to the flowchart in FIG. 2, each of the devices 20 and 30 can implement an example contextual search and query refinement process 200 according to the present invention, which includes the steps of:

Step 202: Extracting contextual information indicating current user activity from application states in the local network.

Step 204: Extracting contextual information about the content in the local network, from metadata sources in the local network.

Step 206: Extracting contextual information about the content in the local network, from metadata sources in an external network.

Step 208: Deriving additional contextual information from the extracted contextual information.

Step 210: Extracting additional contextual information about the content in the local network from results obtained from the external network.

Step 212: Forming an appropriate query based on the obtained contextual information, and performing a search based on the query.

Step 214: Using the contextual information to guide the selection of desired content from the search results.

In one example, step 204 described above for extracting contextual information, includes the further steps of:

(a) Extracting contextual information from one or more of the following sources:
  (i) The user's current activity indicated by the states of applications running on devices in the local network (e.g., the user is playing media in a CD player, wherein the type of content being played is "music"); and
  (ii) Metadata about the content available in the local network, from one of the following sources:
    (1) The metadata sources in the local network (e.g., ID3 tags from a local MP3 player);
    (2) The metadata sources over the external network (e.g., the album, the artist etc., information from a Compact Disc Database (CDDB));
    (3) The metadata embedded in available content (e.g., closed captions), etc.; and (b) Deriving additional contextual information from the obtained contextual information. In one example, given a current activity that is "playing music title: Brand New Day by artist: Sting," it is deduced that Sting may have a "biography" and "Brand New Day" may have "lyrics."

In addition, in step 214 using the obtained contextual information to guide the selection of the most relevant content from the search results can further include forming an appropriate query from the obtained (extracted) contextual information, by:

(a) Using a subset of terms from the obtained contextual information to form a query. For example, "music artist Sting biography age debut."

(b) Using the obtained contextual information to guide the selection of the most relevant content from the search results. For example, while searching for "Sting discography," search results that do not contain the album "Brand New Day" are ignored because from the local content, it is known that one of the albums by Sting is called "Brand New Day."

Figure 3:
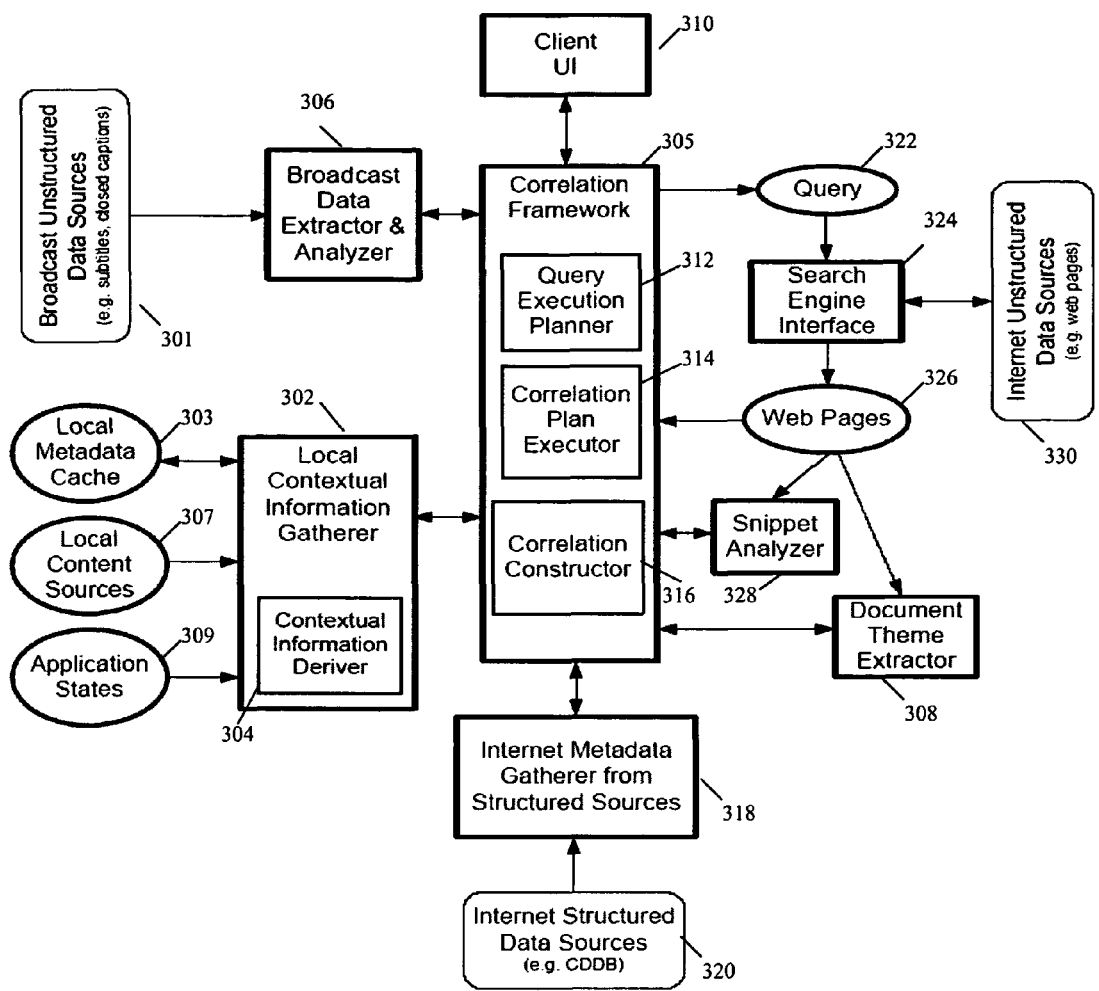
FIG. 3 shows an example functional block diagram of a system implementing a contextual search and query refinement method, according to an embodiment of the present invention.

FIG. 3 shows a functional block diagram of an example system 300 implementing such a contextual search and query refinement process, according to an embodiment of the present invention. The system 300 shows specific components that derive and use contextual information to form a query and to filter the search results for presentation to a user, as described.

The system 300 utilizes the following components: Broadcast Unstructured Data Sources 301, a Local Contextual Information Gatherer 302, a Local Metadata Cache 303, a Contextual Information Deriver 304, a Correlation Framework 305, a Broadcast Data Extractor and Analyzer 306, Local Content Sources 307, Document Theme Extractor 308, Application States 309, a client User Interface (UI) 310, a Query Execution Planner 312, a Correlation Plan Executor 314, a Correlation Constructor 316, an Internet Metadata Gatherer from Structured Sources 318, Internet Structured Data Sources 320, a query 322, a Search Engine Interface 324, Web Pages 326, a Snippet Analyzer 328, and Internet Unstructured Data Sources 330. The function of each component is further described below.

The Broadcast Unstructured Data Sources 301 comprises unstructured data embedded in media streams. Examples of such data sources include cable receivers, satellite receivers, TV antennas, radio antennas, etc.

The Local Contextual Information Gatherer (LCIG) 302 collects metadata and other contextual information about the contents in the local network. The LCIG 302 also derives additional contextual information from existing contextual information. The LCIG 302 further performs one or more of the following functions: (1) gathering metadata from local sources whenever new content is added to the local content/collection, (2) gathering information about a user's current activity from the states of applications running on the local network devices (e.g., devices 20, 30 in FIG. 1), and (3) accepting metadata and/or contextual information extracted from Internet sources and other external sources that describe the local content.

Figure 4:
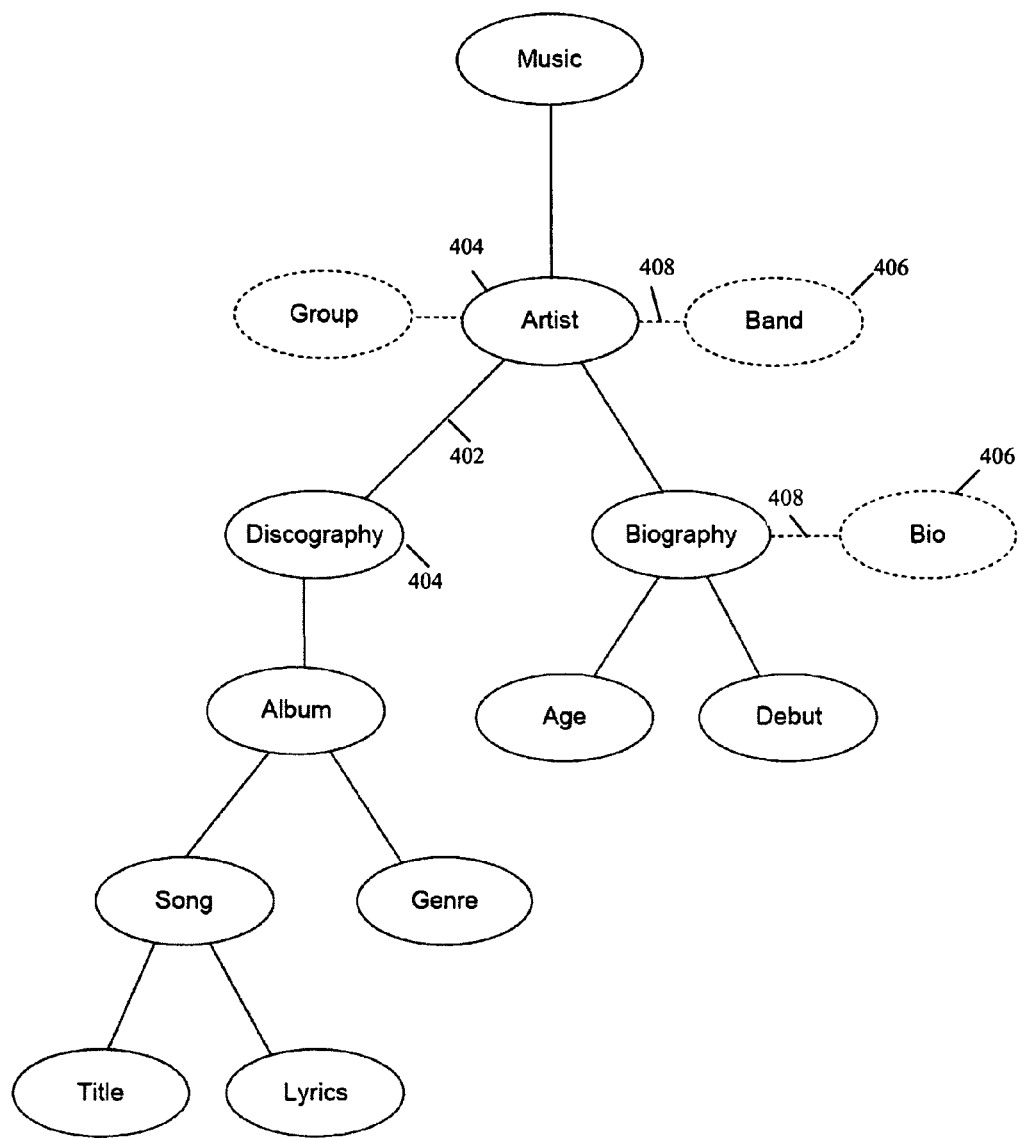
FIG. 4 shows a local taxonomy of metadata, according to an embodiment of the present invention.

The LCIG 302 includes a Contextual Information Deriver (CID) 304 which derives new contextual information from existing information. For this purpose, the CID 304 uses a local taxonomy of metadata related concepts. An example partial taxonomy 400 is shown in FIG. 4. Each edge 402 (solid connector line) connects a pair of concepts 404 (solid ellipses). An edge 408 between a pair of concepts 404 represents a HAS-A relationship between that pair of concepts 404. Each edge 408 (dotted connector line) connects a concept 404 and a synonym 406 (dotted ellipse), and represents a IS-A relationship therebetween. As such, each edge 408 connects a concept 404 with its synonym 406.

In one example where the current information need is about a music artist, the CID 304 uses the taxonomy 400 to determine "biography" and "discography" as derived contextual terms. The CID 304 also knows that "age" and "debut" are relevant concepts in an artist's biography.

Referring back to FIG. 3, the LCIG 302 further maintains a local metadata cache 303, and stores the collected metadata in the cache 303. The cache 303 provides an interface for other system components to add, delete, access, and modify the metadata in the cache 303. For example, the cache 303 provides an interface for the CID 304, Local Content Sources 307, Internet Metadata Gatherer from Structured Sources 318, Broadcast Data Extractor and Analyzer 306, Document Theme Extractor 308 and Snippet Analyzer 328, etc., for extracting metadata from local or external sources.

The Broadcast Data Extractor and Analyzer (BDEA) 306 receives contextual information from the Correlation Framework (CF) 305 described further below, and uses that information to guide the extraction of a list of terms from data embedded in the broadcast content. The BDEA 306 then returns the list of terms back to the CF 305.

The Local Content Sources 307 includes information about the digital content stored in the local network (e.g., on CD's, DVD's, tapes, internal hard disks, removable storage devices, etc.).

The Document Theme Extractor (DTE) 308 receives contextual information from the CF 305 as input and performs one or more of the following operations guided by the contextual information: (1) extracting and selecting a list of terms that best summarize the themes of documents returned as search results by the Search Engine Interface 324, and returning the list to the CF 305, and (2) clustering the documents returned as search results, extracting and selecting therefrom a list of terms that best summarize the themes of each cluster, and returning the list to the CF 305. The DTE 308 decides among one or more of these operations based on current user requirements. For example, if only the top (most important) keywords from a set of documents are needed, then operation 1 above is utilized. If there is a need to cluster the documents returned and then find the most important (representative) keywords from each cluster, then operation 2 above is utilized.

The Local Application States 309 includes information about the current user activity using one or more devices 20 or 30 (e.g., the user is listening to music using a DTV).

The client UI 310 provides an interface for user interaction with the system 300. The UI 310 maps user interface functions to a small number of keys, receives user input from the selected keys and passes the input to the CF 305 in a predefined form. Further, the UI 310 displays the results from the CF 305 when instructed by the CF 305. An implementation of the UI 310 includes a module that receives signals from a remote control, and a web browser that overlays on a TV screen.

The Query Execution Planner (QEP) 312 provides a plan that carries out a user request to perform a task such as a search. The Correlation Plan Executor (CPE) 314 executes the plan by orchestrating components in the system 300 and correlating the results from the components to deliver better results to the user. For example, the CPE 314 performs a "task" by orchestrating all the components and devices required for performing the task.

The Correlation Constructor 316 cooperates with the QEP 312 to form a plan by correlating data gathered from external sources with the data gathered from the local network. The Correlation Constructor 316 can also form the plan automatically using the correlation.

The Metadata Gatherer from Structured Sources 318 gathers metadata about local content from the Internet Structured Data Sources 320. The Internet Structured Data Sources 320 includes data with semantics that are closely defined. Examples of such sources include Internet servers that host XML data enclosed by semantic-defining tags, Internet database servers such as CDDB, etc.

The query 322 is a type of encapsulation of the information desired, and is searched for, such as on the Internet. The query 322 is formed by the CF 305 from the information and metadata gathered from the local and/or external network.

The Search Engine Interface (SEI) 324 inputs a query 322 and transmits it to one or more search engines over the Internet, using a pre-defined Internet communication protocol such as HTTP. The SEI 324 also receives the response to the query from said search engines, and passes the response (i.e., search results) to a component or device that issued the query.

The Internet Unstructured Data Sources 330 includes data or data segments with semantics that cannot be analyzed (e.g., free text). Internet servers that host web pages typically contain this type of data.

The web pages 326 include web pages on the Internet that are returned in the search results. In one example, when a query is sent to a search engine, the search engine returns a list of URLs that are relevant to that query. For each relevant URL, most search engines also return a small piece of text such as a snippet, from a corresponding web page. The main purpose of the snippets is to provide the user a brief overview of what the web page is about. The snippet is either from the web page itself, or taken from the meta tags of the web page. Different search engines have different techniques for generating these snippets.

The Snippet Analyzer 328 inputs the search results and a query from the CF 305. The Snippet Analyzer 328 then analyzes snippets from the search results and extracts from the snippets terms that are relevant to the query. The extracted terms are provided to the CF 305.

The CF 305 orchestrates contextual query formation, contextual search and refinement by:
  (a) Providing contextual information to appropriate components in the system 300 (i.e., one or more of the components 302, 306, 310, 324, 328, 308, 318) for query formation, query plan formation, plan execution or examining search results.
  (b) Receiving a list of terms from components that retrieve related information from the Internet (i.e., one or more of components 308, 328, 324). Then, making the following decisions:
    (i) Whether the terms in the list should be further refined;
    (ii) Whether any of the terms in the list carry contextual information;
    (iii) Whether and how a new query should be formed using the contextual information and the existing query; and
    (iv) Whether any of the contextual information should be used as context for a query.
  (c) If new contextual terms are found from a list of terms, then using all or some of the terms in task formation, and optionally providing the terms to the LCIG 302 to store for later use.
  (d) If a new query should be formed, then constructing the query according to the decision made and executing the new query.

(e) If some of the contextual information should be used as context for a query, then using such information according to a pre-determined format, and executing the query.
(f) If a list of terms returned by a component needs to be further refined, then further refining the list of terms using the contextual information.

As such, a CE device 20 or 30 (FIG. 1) configured based on the process 200 and the system 300 can form a query and perform a search using contextual information about a user's activity, local network content, and the metadata about such content. The user is not required to be involved in this process. Further, users need not be skilled in query formation to obtain relevant results such as from the Internet. Such a configured CE device uses contextual information to select among the relevant results returned in response to the query.

As is known to those skilled in the art, the aforementioned example architectures described above, according to the present invention, can be implemented in many ways, such as program instructions for execution by a processor, as logic circuits, as an application specific integrated circuit, as firmware, etc.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method for automatically obtaining relevant search results from a search engine for a user who is using an electronic device, though a keyboard is not used to manually input search terms, the method comprising:
    facilitating communication between a first electronic device, which is a movie player or a music player, with one or more other devices in a local home network;
    obtaining a media name from one of the devices in the local home network that helps identify a particular song, music group, album or movie that has been played on the first electronic device wherein the media name is at least one selected from the group consisting of a movie title, a song title, a music album name and a music group name;
    performing two linked searches, a first search and a linked second search, to obtain additional information for the user that relates to media played on the first electronic device, wherein the two linked searches do not involve search terms that are directly inputted by the user and wherein the two linked searches include:
    automatically performing a first search of the Internet using one or more search terms that include at least a part of the media name;
    identifying a plurality of web pages using the first search;
    receiving web page text contained in the plurality of web pages identified in the first search;
    automatically analyzing the web page text to determine that some of the web page text provides additional contextual information relating to the media name;
    automatically selecting at least some of the web page text to use as one or more search terms in the second search;
    automatically performing the second search on an external network using the selected web page text as one or more search terms in the second search;
    receiving a search result in response to the second search; and
    displaying information to the user based on the search result from the second search.

2. A method as recited in claim 1 wherein the local home network includes a second consumer electronic device, the method further comprising:
    obtaining information from the second consumer electronic device in the local home network a wherein the one or more search terms used in the first search are based on the media name and the information obtained from the second consumer electronic device.

3. A method as recited in claim 1 wherein the steps of said method are performed at the first consumer electronic device.

4. A method as recited in claim 1 wherein the steps of said method are performed at a second consumer electronic device that is coupled with the first consumer electronic device.

5. A method as recited in claim 1 wherein:
    the external network is the Internet; and
    the performing of the first search involves automatically entering the one or more search terms into an Internet search engine.

6. A method as recited in claim 1 wherein the displaying of the information to the user is performed at a display module wherein the display module is selected from the group consisting of (a) a module that is part of the first consumer electronic device; and (b) a module that is coupled with but separate from the first consumer electronic device.

7. A method as recited in claim 1 further comprising:
    analyzing the search result received in response to the second search to determine that a part of the search result is desirable and other parts of the search result are undesirable based on the least one selected from the group consisting of: (a) device activity information obtained from the first consumer electronic device and (b) the web page text received in response to the first search; and
    displaying the information to the user that is based on the desirable part of the search result and not based on the undesirable parts of the search result.

8. A method as recited in claim 1 further comprising:
    obtaining external data from a database that is coupled with the first consumer electronic device through an external network wherein:
    the external data provides additional information related to current user activity on the first consumer electronic device; and
    the one or more search terms used in the first search are based on the external data obtained from the database.

9. A method as recited in claim 2 wherein neither the first nor the second consumer electronic device involves a physical keyboard suitable for manually typing words and search terms.

10. A method as recited in claim 1 wherein the one or more search terms used in the first search are automatically determined and do not require the user to directly type any search terms.

11. A method as recited in claim 1 further comprising:
    deriving additional search terms from the one or more search terms used in the first search, which includes:
    extrapolating additional search terms from the one or more search terms used in the first search; and
    using the additional search terms in another search.

12. A method as recited in claim 11 wherein:
    the extrapolating of the additional search terms is based on a taxonomy;
    the taxonomy is represented by a plurality of nodes that are connected by a multiplicity of edges, each node representing a concept, the multiplicity of edges including a first and a second type of edge, the first type of edge representing a "has" relationship between two of the concepts, the second type of edge representing a "is" relationship between two of the concepts;

the extrapolating of the additional search terms further involves:

matching at least one of the one or more search terms used in the first search with at least one of the nodes; and deriving the additional search terms from concepts that are linked by edges to the at least one of the nodes.

13. A method as recited in claim 1 wherein the first consumer electronic device is selected from the group consisting of a mobile phone, a personal digital assistant (PDA), an MP3 player and a television.

14. A computing system suitable for automatically obtaining relevant search results from a search engine for a user who is using an electronic device, though a keyboard is not used to manually input search terms, comprising:

at least one processor;

at least one memory that stores computer readable instructions, which when executed by the computing system cause the computing system to:

facilitate communication between a first electronic device, which is a movie player or a music player, with one or more other devices in a local home network;

obtain a media name from one of the devices in the local home network that helps identify a particular song, music group, album or movie that has been played on the first electronic device wherein the media name is at least one selected from the group consisting of a movie title, a song title, a music album name and a music group name;

perform two linked searches, a first search and a linked second search, to obtain additional information for the user that relates to media played on the first electronic device, wherein the two linked searches do not involve search terms that are directly inputted by the user;

automatically perform the first search wherein the first search is of the Internet and uses one or more search terms that include at least a part of the media name;

identify a plurality of web pages using the first search;

receive web page text contained in the plurality of web pages identified in the first search;

automatically analyze the web page text to determine that some of the web page text provides additional contextual information relating to the media name;

automatically select at least some of the web page text to use as one or more search terms in the second search;

automatically perform the second search on an external network using the selected web page text as one or more search terms in the second search second search query, which is based on the first and second sets of search terms;

receive a search result in response to the second search; and display information to the user based on the search result from the second search.

15. A computing system as recited in claim 14 wherein the computer readable instructions, when executed by the computer system, further cause the computing system to:

obtain information from a second consumer electronic device in the local home network wherein the one or more search terms used in the first search are based on the media name and the information obtained from the second consumer electronic device.

16. A computing system as recited in claim 14 wherein the computing system is a second consumer electronic device that is coupled with the first consumer electronic device.

17. A computing system as recited in claim 14 wherein the computing system is part of the first consumer electronic device.

18. A computing system as recited in claim 14 wherein the computing system is separate from and coupled with the first consumer electronic device.

19. A computing system as recited in claim 14 wherein:

the external network is the Internet; and the performing of the first search involves entering the first set of search terms into an Internet search engine.

20. An electronic device that automatically obtains relevant search results from a search engine for a user, though a keyboard is not used to manually input search terms, wherein the electronic device includes:

executable code operable to facilitate communication between a electronic device, which is a movie player or a music player, with one or more other devices in a local home network;

executable code operable to obtain a media name from one of the devices in the local home network that helps identify a particular song, music group, album or movie that has been played on the electronic device wherein the media name is at least one selected from the group consisting of a movie title, a song title, a music album name and a music group name;

executable code operable to perform two linked searches, a first search and a linked second search, to obtain additional information for the user that relates to media played on the electronic device, wherein the two linked searches do not involve search terms that are directly inputted by the user;

executable code operable to automatically perform the first search of the Internet using one or more search terms that include at least a part of the media name;

executable code operable to identify a plurality of web pages using the first search;

executable code operable to receive web page text contained in the plurality of web pages identified in the first search;

executable code operable to automatically analyze the web page text to determine that some of the web page text provides additional contextual information relating to the media name;

executable code operable to automatically select at least some of the web page text to use as one or more search terms in the second search;

executable code operable to automatically perform the second search on an external network using the selected web page text as one or more search terms in the second search;

executable code operable to receive a search result in response to the second search; and executable code operable to display information to the user based on the search result from the second search.

21. An electronic device as recited in claim 20 further includes:

executable code operable to obtain information from a second electronic device in the local home network wherein the one or more search terms used in the first search are based on the media name and the information obtained from the second electronic device.

22. An electronic device as recited in claim 20 wherein:

the external network is the Internet; and the performing of the first search involves automatically entering the one or more search terms into an Internet search engine.

23. A method for automatically obtaining more accurate and relevant information relating to music that a user is playing on an electronic device, the method comprising:
- facilitating communication between a first electronic device, which is a music player, with one or more other devices in a local home network;
- determining that the first electronic device is currently playing music;
- performing three searches, a first local search, a second Internet search and a third search, to obtain additional information for the user that relates to the music played on the first electronic device, wherein the three searches do not involve search terms that are directly inputted by the user and wherein the three searches involve:
- automatically performing the first search of the one or more networked devices in the local home network to find out more information relating to the music that is being played on the first electronic device;
- automatically performing the second search of the Internet to find out more information relating to the music that is being played on the first electronic device;
- receiving preliminary search results in response to the first and second searches;
- determining from the preliminary search results a media name that helps describe the music played on the first electronic device, the media name being one selected from the group consisting of a name of an album that contains the played music, a name of a music group that performs the played music and a name of an artist that performs the played music;
- forming a search query using the media name as one or more search terms;
- adding one or more additional search terms to the search query that indicate an interest in additional background information for the media name, the background information being at least one selected from the group consisting of lyrics of the played song and biographical information about the artist that performs the played music;
- after the additional terms have been added to the search query, performing the third search of the Internet using the search query;
- receiving search results in response to the third search that contains said background information; and
- displaying information to the user based on the search results received in response to the third search.

24. A method as recited in claim 23 wherein the first search of the local home network involves searching for and obtaining information from metadata of an audio file stored in a device on the local home network.

25. A method as recited in claim 24, wherein the audio file is an MP3 file and wherein the first search involves obtaining information from an ID3 tag of the MP3 audio file.

26. A method as recited in claim 23 wherein the second search of the local home network involves searching for and obtaining information from a Compact Disc Database (CDDB).

* * * * *